(12) United States Patent
Eiraku et al.

(10) Patent No.: US 6,867,824 B2
(45) Date of Patent: Mar. 15, 2005

(54) DISPLAY DEVICE

(75) Inventors: Takayuki Eiraku, Kawasaki (JP); Seiji Hayashimoto, Kawasaki (JP)

(73) Assignee: Fujitsu Display Technologies Corporation, Kawasaki (JP)

( * ) Notice: Subject to any disclaimer, the term of this patent is extended or adjusted under 35 U.S.C. 154(b) by 29 days.

(21) Appl. No.: 10/146,751

(22) Filed: May 16, 2002

(65) Prior Publication Data

US 2003/0122993 A1 Jul. 3, 2003

(30) Foreign Application Priority Data

Dec. 28, 2001 (JP) ........................................ 2001-399594

(51) Int. Cl.$^7$ ............................................. G02F 1/1333
(52) U.S. Cl. ......................................................... 349/58
(58) Field of Search ...................... 349/58, 61; 361/681, 361/682

(56) References Cited

U.S. PATENT DOCUMENTS 6,373,537 B2 * 4/2002 Yun et al. ...................... 349/58
6,501,641 B1 * 12/2002 Kim et al. ................... 361/681
6,504,586 B1 * 1/2003 Lee .............................. 349/58
6,542,206 B1 * 4/2003 Saito ............................ 349/58

FOREIGN PATENT DOCUMENTS

| EP | 0 424 898 A2 | 10/1990 |
| GB | 2255678 | 11/1992 |
| JP | 2000-276254 | 10/2000 |

* cited by examiner

*Primary Examiner*—Toan Ton
(74) *Attorney, Agent, or Firm*—Greer, Burns & Crain, Ltd.

(57) ABSTRACT

A liquid crystal display unit having a liquid crystal display element is accommodated in a housing having an opening for exposing the display portion of the display element to the exterior. The housing comprises a display face cover and a rear cover and the liquid crystal display unit is mounted directly relative to the display face cover. A positioning pin is provided so as to extend out from the display face cover in order to position the liquid crystal display unit relative to the display face cover, and a positioning hole, which engages the positioning pin, is provided on the liquid crystal unit.

4 Claims, 5 Drawing Sheets

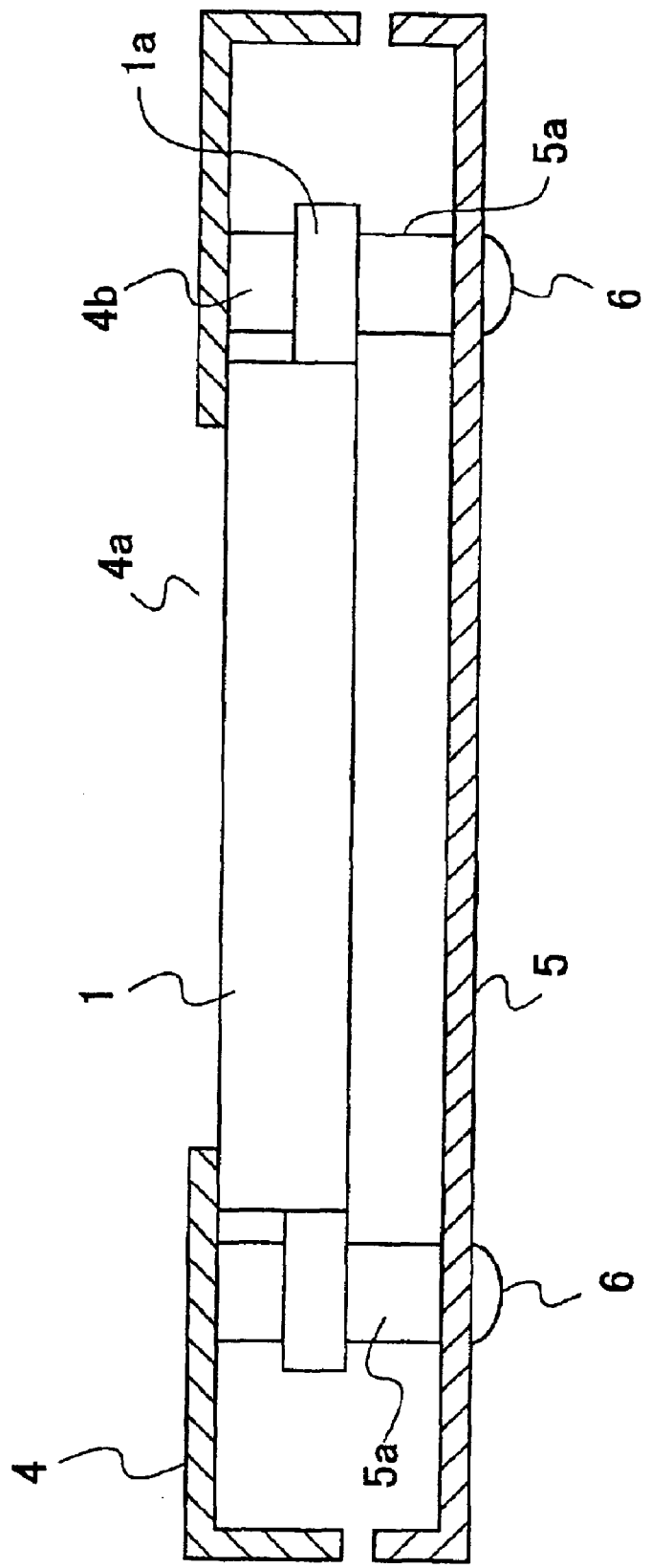

DISPLAY DEVICE

BACKGROUND OF THE INVENTION

1. Field of the Invention

The present invention relates to a display device, and in particular to a display device having a display element incorporated within the housing of the display device.

2. Description of the Related Art

FIG. 1 is a cross-sectional view of a conventional liquid crystal display device having a liquid crystal display element incorporated therein. In the conventional liquid crystal display device shown in FIG. 1, a liquid crystal display unit 1 having a liquid crystal display element incorporated is mounted to a chassis 2 using screws 3. The chassis 2 is mounted to a display face cover 4 in such a manner that the display portion of the liquid crystal display unit 1 is situated at an opening 4a of the display face cover 4. At the same time, a rear cover 5 is also mounted to the chassis 2. In short, the display face cover 4 and the rear cover 5 are fixed to each other, having the chassis 2 in between themselves, by inserting screws 6 from the side of the rear cover 5. Therefore, the display face cover 4 and the rear cover 5 constitute the housing of the display device.

It is noted that in the conventional liquid crystal display device shown in FIG. 1, the liquid crystal display unit 1 is an assembly comprising the liquid crystal display element and a backlight device and is configured such that the liquid crystal display element is mounted relative to the housing of the backlight device. Mounting portions 1a extend from the housing of the backlight device and the mounting portions 1a are fixed to the chassis 2 by the screws 3.

An assembly process of the conventional liquid crystal display device shown in FIG. 1 comprises the steps of; forming the liquid crystal display unit 1 by positioning and fixing the liquid crystal display element relative to the housing of the backlight device, positioning the housing of the backlight device relative to the chassis 2, and fixing the housing of the backlight device relative to the chassis by the screws 3. The assembly process further comprises the steps of; positioning the chassis 2 having the liquid crystal display unit mounted thereon relative to the opening 4a of the display face cover 4 and simultaneously fixing the chassis 2 and the rear cover 5 to the display face cover 4 by the screws 6.

In the above-mentioned assembly process, positioning accuracy between the display portion of the liquid crystal display unit 1 and the opening 4a of the display face cover 4 is low and when positioning errors accumulate, there arises a problem such that the display portion of the liquid crystal display unit 1 deviates from the opening 4a of the display face cover 4. In other words, since the positioning of the liquid crystal display unit 1 relative to the display face cover 4 involves the positioning of the liquid crystal display unit 1 relative to the chassis 2 and the positioning of the chassis 2 relative to the display face cover 4, there is a possibility that the positioning errors from the respective positionings may accumulate and in a worst case, there is a problem in which a part of the display portion of the liquid crystal display unit 1 deviates from the opening 4a of the display face cover 4.

SUMMARY OF THE INVENTION

In view of the problems mentioned above, an object of the present invention is to provide a display device capable of having the display portion of the display element accurately positioned relative to an opening in the display face cover.

In order to overcome the problems according to the related art, the present invention is characterized in that the several means described in the following are provided.

There is provided according to the present invention a display device comprising a display unit having a display element, a housing having an opening provided for exposing the display portion of the display element to the exterior, the display unit being mounted directly to the housing, a positioning protrusion extending out from one of the housing and the display unit so as to position the display unit to the housing, and a positioning hole, provided on the other one of the housing and the display unit, so as to be engaged with the positioning protrusion.

According to the present invention, a chassis, which is needed in the conventional display device for mounting the liquid crystal display unit, is dispensed with and the display unit is mounted directly relative to the housing, thus the display unit can be accurately positioned relative to the housing. In addition, since the chassis is dispensed with, a smaller number of components for the display device is possible, resulting in a decrease in the manufacturing cost. Also, by providing the positioning protrusion and the positioning hole, no special process is needed for positioning the display unit relative to the housing and an automated positioning is achieved only by mounting the display unit.

According to the present invention, the display unit may be mounted to the housing by a screw, and a screw hole in the housing for engaging with the screw is formed in the positioning protrusion.

According to the present invention, a portion for mounting the display unit and the positioning protrusion may be formed as an integral part.

According to the present invention, the housing comprises an upper housing having the opening, and a lower housing, and the lower housing may be mounted to the upper housing through a mounting portion of the display unit relative to the upper housing.

According to the present invention, both the display unit and the lower housing may be mounted to the upper housing simultaneously, as a result of which the number of steps needed in the assembly process may be reduced.

According to the present invention, the following various advantages are effectively realized.

First, according to the present invention, a chassis, which is needed in the conventional display device for mounting the liquid crystal display unit, is dispensed with and the display unit is mounted directly relative to the housing, thus the display unit can be accurately positioned relative to the housing. Since the chassis is dispensed with, a smaller number of components for the display device is possible, resulting in a decrease in the manufacturing cost. Also, by providing the positioning protrusion and the positioning hole, no special process is needed for positioning the display unit relative to the housing and the automated positioning is achieved only by mounting the display unit.

According to the present invention, a portion for mounting the display unit and the positioning protrusion may be formed as an integral part.

According to the present invention, the display unit and the lower housing may be mounted to the upper housing simultaneously, as a result of which the number of steps needed in the assembly process may be reduced.

The present invention and the preferred embodiments of the present invention will be described with reference to the accompanying figures.

BRIEF DESCRIPTION OF THE DRAWINGS

Other objects, advantages, and further features of the present invention will become more apparent as the description proceeds taken in conjunction with the accompanying drawings in which:

FIG. 5 is a cross-sectional view of a liquid crystal display device according to the second embodiment of the present invention.

DETAILED DESCRIPTION OF THE PREFERRED EMBODIMENT

Figure 1:
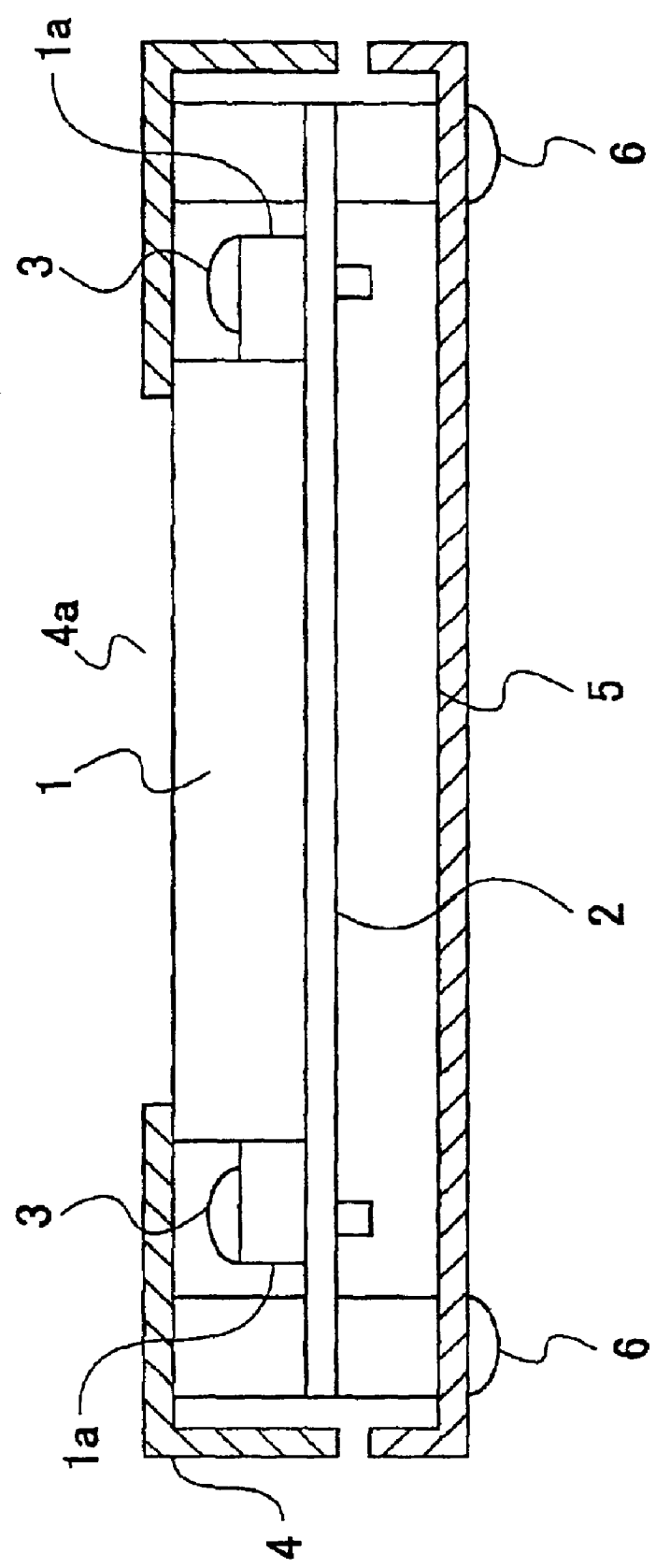
FIG. 1 is a cross-sectional view of a conventional liquid crystal display device incorporating a liquid crystal display element therein.
Figure 2:
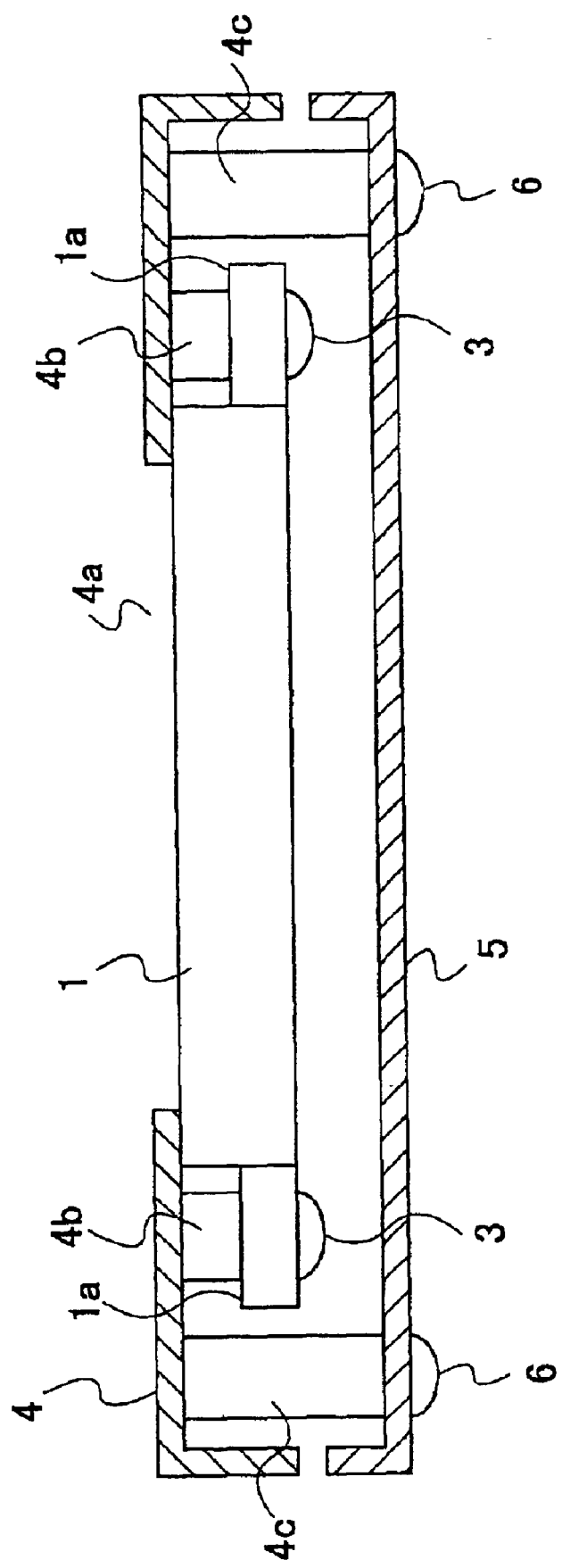
FIG. 2 is a cross-sectional view of a liquid crystal display device according to the first embodiment of the present invention.

FIG. 2 is a cross-sectional view of a liquid crystal display device according to a first embodiment of the present invention. The housing of the liquid crystal display device shown in FIG. 2 comprises a display face cover 4 corresponding to an upper housing and a rear cover 5 corresponding to a lower housing. An opening 4a is formed in the display face cover 4 and the display portion of the liquid crystal display unit 1 is exposed through the opening 4a.

The liquid crystal display unit 1 comprises a liquid crystal element and a backlight device and is configured such that the liquid crystal display element is mounted relative to the housing of the backlight device. The backlight device projects light from the backside of the liquid crystal display element so as to make visible the display on the liquid crystal display element, is mounted to the housing, and has a light source such as a fluorescent lamp.

According to the first embodiment of the present invention, a mounting portion 1a extending from the housing of the backlight device is mounted directly to the display face cover 4. In short, a boss portion 4b is formed so as to extend from the backside of the display face cover 4 and a screw hole is formed in the boss portion 4a. The liquid crystal display unit 1 is mounted to the display face cover 4 by superimposing the mounting portion 1a of the liquid crystal unit 1 on the boss portion 4b and by screwing a screw 3 into the screw hole in the boss portion 4b.

Figure 3:
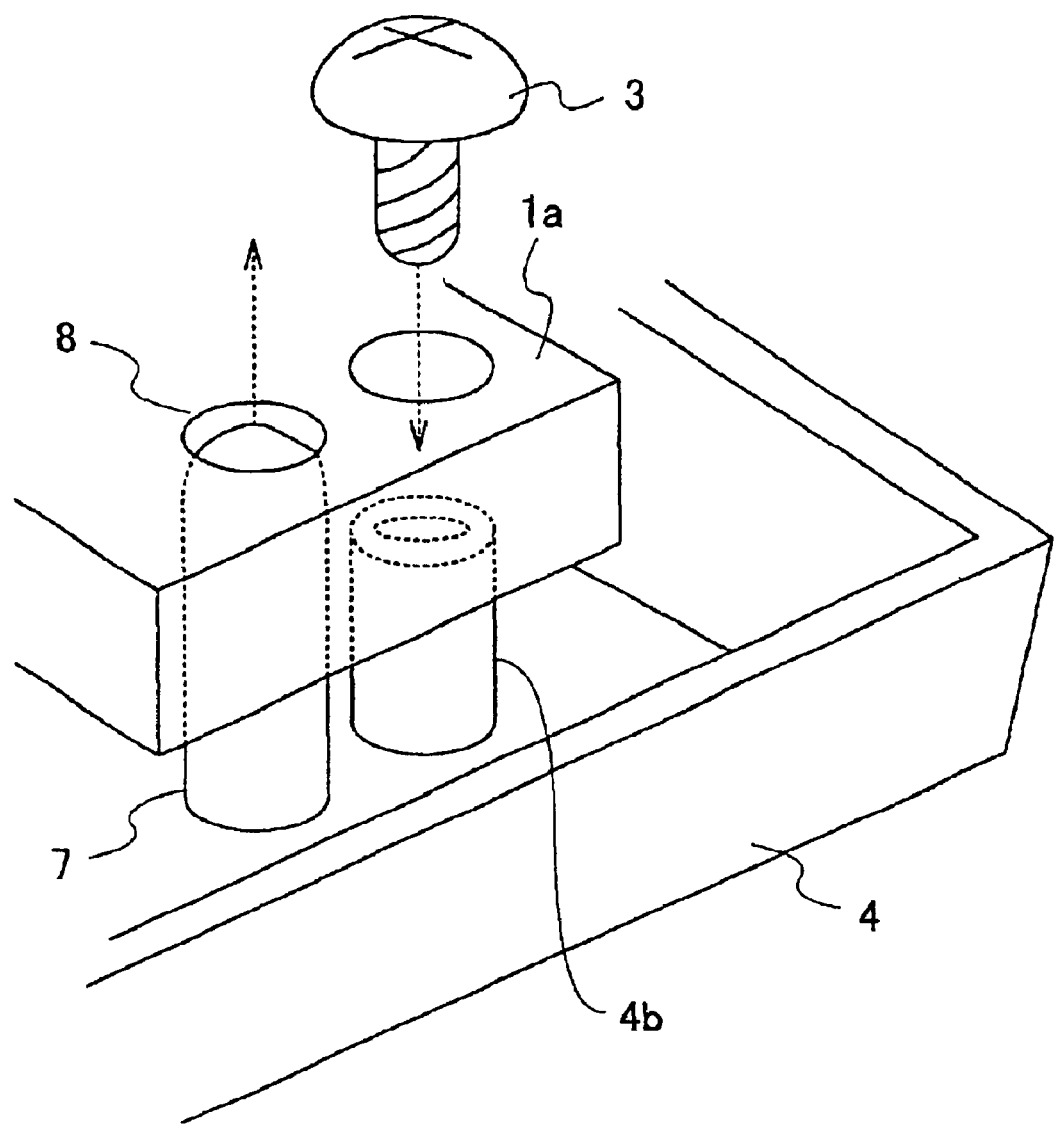
FIG. 3 is a perspective view illustrating a mounting portion of the liquid crystal display unit shown in FIG. 2.

The positioning of the liquid crystal display unit 1 relative to the opening 4a of the display face cover 4 shown in FIG. 3 is achieved by engaging a positioning pin 7 (a positioning protrusion) into a positioning hole 8. FIG. 3 shows a perspective view of the mounting portion 1a of the liquid crystal display unit 1. It is noted that the mounting portion 1a shown in FIG. 3 is reversed from that shown in FIG. 2.

As shown in FIG. 3, the positioning pin 7 is formed in vicinity of the boss portion 4b so as to extend out from the backside of the display face cover 4, and the positioning hole 8 is formed at a corresponding location in the mounting portion 1a of the liquid crystal display unit 1. The display face cover 4 is molded from resin molding and thus the boss portion 4b and the positioning pin 7 are integrally formed when the display face cover 4 is molded and their positions are accurately maintained.

The protrusion length of the positioning pin 7 is longer than that of the boss portion 4b. For this reason, when mounting the mounting portion 1a of the liquid crystal display unit 1 to the boss portion 4b, first the positioning pin 7 is inserted into the positioning hole 8 in the mounting portion 1a and engages therein. Thereafter, having the positioning pin 7 engaged in the positioning hole 8 in the mounting portion 1a, the mounting portion 1a is further superimposed on the boss portion 4b. Therefore, the positioning pin 7 and the positioning hole 8 are already engaged when the mounting portion 1a is to be fixed by the screw 3, which means that the liquid crystal display unit 1 is already positioned relative to the display face cover 4.

By providing the positioning pin 7 and the positioning hole 8 in the way mentioned above, no special process is needed for positioning the liquid crystal display unit 1 relative to the display face cover 4 and also the positioning is achieved automatically only by mounting the liquid crystal display unit 1.

After the liquid crystal display unit 1 is mounted to the display face cover 4, the rear cover 5 is mounted to the display face cover 4. As shown in FIG. 2, a boss portion 4c is formed so as to extend out from the display face cover 4 and the rear cover 5 is fixed relative to the boss portion 4c by a screw 6.

It is noted that in the above-mentioned embodiment, although the positioning pin 7 is formed in the display face cover 4 and the positioning hole 8 is formed in the liquid crystal display unit 1, it is also possible to form the positioning pin in the liquid crystal display unit 1 and the positioning hole in the display face cover 4 so as to position the liquid crystal display unit 1 relative to the opening 4a of the display face cover 4.

As mentioned above, the display device according to the present invention dispenses with a chassis for mounting the liquid crystal display unit 1 which is needed in the conventional display device, and instead the liquid crystal display unit 1 according to the present invention is mounted directly to the display face cover 4 corresponding to the upper housing. Thus, the liquid crystal display unit 1 can be accurately positioned relative to the display face cover 4. In addition, since the chassis is dispensed with, a smaller number of components for the display device is possible, resulting in a decrease in the manufacturing cost.

Figure 4:
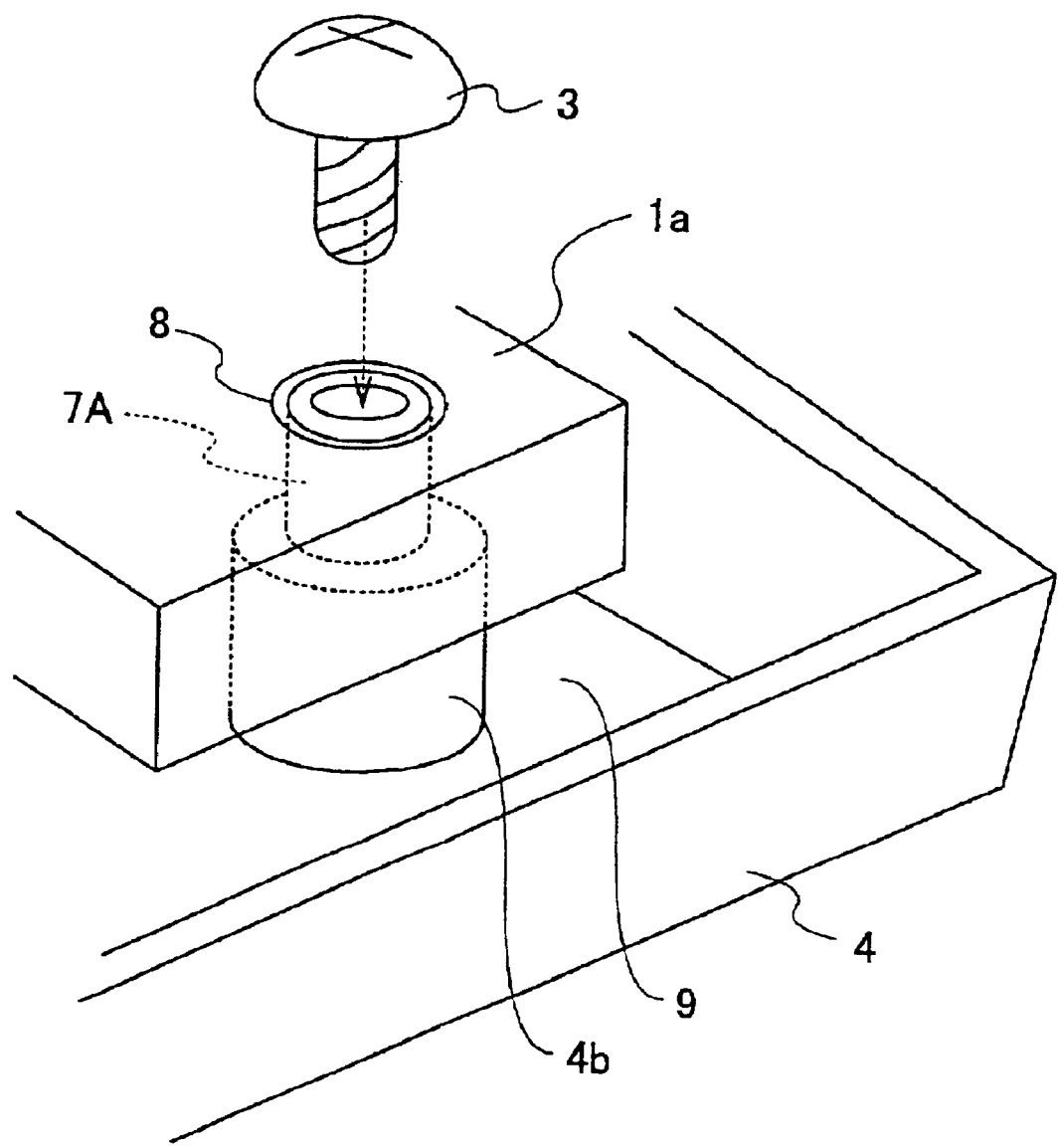
FIG. 4 is a perspective view illustrating a variant of a mounting configuration shown in FIG. 3.

The following is a description, with reference to FIG. 4, of a variant of the mounting configuration of the liquid crystal unit 1 shown in FIG. 3.

In the mounting configuration shown in FIG. 4, the boss portion and the positioning pin for mounting the liquid crystal display unit 1 are formed integrally. In other words, a two-stepped protrusion 9 shown in FIG. 4 has a lower thick portion corresponding to the boss portion 4b shown in FIG. 3 and the upper thin portion, which is a positioning pin 7A, corresponding to the positioning pin 7 shown in FIG. 3. A screw hole is formed in the positioning pin 7A and the liquid crystal display unit 1 is mounted relative to the display face cover 4 corresponding to the upper housing using the screw hole.

In the variant shown in FIG. 4, only the positioning hole 8 is formed in the mounting portion 1a of the liquid crystal display unit 1. The diameter of the positioning hole 8 in the mounting portion is smaller than that of the boss portion 4b and thus even when the positioning hole 8 is in engagement with the positioning pin 7A, the mounting portion 1a does not go further down on the boss portion 4b. The length of the positioning pin 7A is set smaller than the thickness of the mounting portion and a screw hole is formed in the positioning pin 7A. Therefore, the mounting portion 1a can be fixed relative to the display face cover by screwing a screw 3 into the screw hole.

The following is a description of a liquid crystal display device according to a second embodiment of the present invention with reference to FIG. 5. The display device according to the second embodiment of the present invention differs in its mounting configuration of the rear cover 5 from that shown in FIG. 2.

In short, in the second embodiment according to the present invention shown in FIG. 5, the rear cover 5 corresponding to the lower housing is mounted to the display face cover 4 through the mounting portion 1a of the liquid crystal display unit 1. In this case, a boss portion 5a is formed integrally inside the rear cover 5 and a perforation is formed in the boss portion 5a into which a screw 6 is to be inserted.

The screw 6 is inserted into the perforation from the exterior side of the rear cover 5, penetrates the perforation in the mounting portion 1a, reaches the boss portion 4b of the display face cover 4, and is finally screwed into the screw hole formed in the boss portion 4b. It is noted that in the second embodiment according to the present invention, the positioning of the liquid crystal display unit 1 relative to the display face cover 4 is achieved by the same configuration of the positioning pin and the positioning hole as described in the above-mentioned first embodiment.

In the second embodiment according to the present invention, therefore, the liquid crystal display unit 1 and the rear cover 5 can be simultaneously mounted to the display face cover 4 while positioning the liquid crystal display unit 1 relative to the display face cover 4. As a result, the number of steps needed in the assembly process as well as the manufacturing cost may be reduced.

Further, the present invention is not limited to the above-described embodiments, and variations and modifications may be made without departing from the scope of the present invention.

The present application is based on Japanese priority application No. 2001-399594, filed on Dec. 28, 2001, the entire contents of which are hereby incorporated by reference.

What is claimed is:

1. A display device comprising:

a display unit having a display element;

a housing having an opening provided for exposing a display portion of the display element to the exterior, said display unit being mounted directly to said housing;

a positioning protrusion extending out from one of said housing and said display unit so as to position said display unit to said housing; and a positioning hole, provided on the other one of said housing and said display unit, so as to be engaged with the positioning protrusion which fits in the positioning hole.

2. The display device as claimed in claim 1, wherein said display unit is mounted to said housing by a screw, and a screw hole for engaging with the screw is formed in the positioning protrusion of the housing.

3. A display device comprising:

a display unit having a display element;

a housing having an opening provided for exposing a display portion of the display element to the exterior, said display unit being mounted directly to said housing;

a positioning protrusion extending out from one of said housing and said display unit so as to position said display unit to said housing; and a positioning hole, provided on the other one of said housing and said display unit, so as to be engaged with the positioning protrusion, wherein said housing comprises an upper housing having the opening and a lower housing, and the lower housing is mounted to the upper housing through a mounting portion of said display unit relative to the upper housing.

4. A display device comprising:

a display unit having a display element;

a housing having an opening provided for exposing a display portion of the display element to the exterior, said display unit being mounted directly to said housing;

a positioning protrusion extending out from one of said housing and said display unit so as to position said display unit to said housing; and a positioning hole, provided on the other one of said housing and said display unit, so as to be engaged with the positioning protrusion, wherein said display unit is mounted to said housing by a screw, and a screw hole for engaging with the screw is formed in the positioning protrusion of the housing, and wherein said housing comprises an upper housing having the opening and a lower housing, and the lower housing is mounted to the upper housing through a mounting portion of said display unit relative to the upper housing.

* * * * *